United States Patent [19]

Sado et al.

[11] 4,302,648
[45] Nov. 24, 1981

[54] KEY-BOARD SWITCH UNIT

[75] Inventors: Ryoichi Sado, Saitama; Takekuni Okamoto; Shigeru Matumoto, both of Tokyo, all of Japan

[73] Assignee: Shin-Etsu Polymer Co., Ltd., Tokyo, Japan

[21] Appl. No.: 167,334

[22] Filed: Jul. 9, 1980

Related U.S. Application Data

[63] Continuation-in-part of Ser. No. 5,513, Jan. 22, 1979, abandoned.

[51] Int. Cl.³ .......................... H01H 3/12; H01H 9/26
[52] U.S. Cl. ................................................. 200/159 B
[58] Field of Search ................... 200/159 B, 5 A, 5 R

[56] References Cited

U.S. PATENT DOCUMENTS

| | | | |
|---|---|---|---|
| 3,793,649 | 2/1974 | Tarnopolsky et al. | 200/159 B |
| 4,129,758 | 12/1978 | Gilano et al. | 200/159 B |
| 4,197,439 | 4/1980 | Mecklenburg et al. | 200/159 B |
| 4,207,443 | 6/1980 | Matsuura | 200/159 B |

FOREIGN PATENT DOCUMENTS 2903898 8/1979 Fed. Rep. of Germany ... 200/159 B

Primary Examiner—Willis Little
Attorney, Agent, or Firm—Hopgood, Calimafde, Kalil, Blaustein & Judlowe

[57] ABSTRACT

The invention provides a key-board switch unit used, for example, in pocketable electronic calculators comprising a base plate having at least one pair of switch electrodes and a covering pad made of an insulating rubber and provided with at least one contact member made of an electroconductive rubber and bonded on the lower surface thereof to face the electrodes coming into contact therewith when the pad is depressed. The contact member is embedded in the covering pad in such a manner that the surface of it is coplanar with the surface of the covering pad at least along the peripheries in conjunction with the covering pad and the contact member is sufficiently small so as to be confined within the area of the covering pad facing the void space formed between the base plate and the covering pad at the portion of the electrodes. The hardness relationship between the rubbery materials of the covering pad and the contact member is also of essential importance for reliable switching and durability of the switch unit.

4 Claims, 5 Drawing Figures

KEY-BOARD SWITCH UNIT

BACKGROUND OF THE INVENTION

This is a continuation-in part application of a U.S. application Ser. No. 5,513 filed Jan. 22, 1979 now abandoned.

The present invention relates to a novel and improved key-board switch unit of very small thickness including a covering rubber pad having at least one contact member and mounted over a base plate having at least one pair of electrodes to be connected with the contact member.

In recent times, small-sized push-button switch panels have widely been employed in key-board switch units for various electric and electronic appliances, such as pocketable calculators, television sets, radio sets, phonographic sets and the like. One typical switch panel is constructed with an electrically-insulating, resilient and elastic pad having a plurality of upwardly protruded bosses, each boss having a contact member of an electroconductive, flexible rubber-like material downwardly extended a short distance corresponding to a pair of switch electrodes fixed on a base plate, so that an electric connection can be formed between the two electrodes by manual depression of the protruded boss to force the contact member into contact with the electrodes, resulting in closing electric circuit therebetween, and the electric connection is made off by release of manual pressure which causes the resilient boss to return the contact member upward out of contact with the electrodes.

A variety of modifications have been proposed to the push-button switch panels of the above type, as disclosed in, for example, Japanese Patent Publication No. 51-32838, Japanese Patent Disclosures Nos. 47-29877, 48-30064, 49-50465, 49-67172 and Japanese Utility Model Disclosures Nos. 48-13764, 48-105863, 49-124571, 49-124572 and 51-17757.

In parallel with improvements or technical progresses in the functional parts of the device, electric or electronic appliances in which the push-button switch panels are built have been desired to be made smaller and thinner in size and, accordingly, the push-button switch panels per se have also been desired to be as small and thin. However, a very difficult problem has been unavoidable in designing very small or thin switch panels because the contact member used in the prior art switch panel was downwardly extending and protruded out of the thickness of the covering pad into a space formed above the base plate.

Further, when the contact member was made of an electroconductive rubbery elastomer filled with an electroconductive filler, it has been unavoidable that strains are formed in the contact member due to thermal expansion and compression in the molding step, resulting in adversely affecting the accuracy of the distance between the surfaces of the contact member and the switch electrodes, i.e., the stroke of the contact member and also resulting in lowering the reliability of switching operation or possibly causing erroneous contact, especially when the thickness of the switch is extremely small.

Furthermore, it has been found that the operation of the prior art switch having protruded pressure surface is not always reliable due to manual downward depression which is accidentally made in a direction biased from the vertical.

In addition, when the contact member is formed of a coating layer of an electroconductive coating composition filled with a large amount of an electroconductive powdery material, it has been found that uncontrollable irregularities frequently take place on the coated surface due to the degraded rheological behavior of the coating composition, resulting also in erroneous operations of the switch panels. Thus, unsurmountable difficulties have been laid on the attempts to miniaturize the push-button switch panels.

SUMMARY OF THE INVENTION

It is therefore an object of the present invention to provide a novel and improved push-button key-board switch unit having a rubber pad covering a base plate and functional parts which is free from the above-described problems encountered in the conventional types and which can be made so compactly and thinly as to satisfy the recent demand for the miniaturization of electric and electronic appliances.

The key-board switch unit of the invention comprises
(a) a base plate,
(b) at least one pair of electrodes fixedly provided on one surface of said base plate,
(c) a covering pad made of an electrically insulating rubbery matrial having a hardness of 30 to 70 in the JIS scale placed to cover the base plate leaving at least one void space therebetween at the portion facing the pair of the electrodes, and
(d) at least one contact member made of an electrically conductive rubbery material having a hardness of 40 to 80 in the JIS scale and embedded in and adhesively bonded to the covering pad at the portion facing the void space in such a manner that, when the covering pad is depressed toward the base plate, the contact member comes into contact with the electrodes to close an electric circuit therebetween, the surface of the contact member being at substantially the same level at least at the periphery thereof in conjunction with the covering pad as the surface of the covering pad in the portion of the void space facing the electrodes and the surface of the contact member facing the electrodes being confined within the surface of the covering pad in the portion of the void space.

DETAILED DESCRIPTION OF THE PREFERRED EMBODIMENTS

Figure 1:
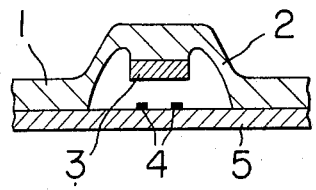
FIG. 1 is a cross sectional view of part of a conventional key-board switch unit.

The conventional key-board switch unit, illustrated in FIG. 1 by the cross sectional view of part of it, has a covering pad 1 made of an electrically insulating rubbery material and having at least one or, rather usually, a plurality of upwardly protruded bosses 2. A contact member 3 made of an electroconductive rubbery material is adhesively bonded to the lower surface of the top portion of the protruded boss downwardly extending to face a pair of switch electrodes 4,4, on a base plate 5 on which the covering pad 1 is mounted. The manual depression of the upper surface of the protruded boss 2 will deform the covering pad 1 at that portion to bring the contact member 3 into contact with the electrodes 4,4 closing the electric circuit therebetween through the contact member 3. The electric circuit will be opened when depression is released and the resilient depressed boss 2 causes the contact member 3 upward out of contact with the switch electrodes 4,4.

Figure 2:
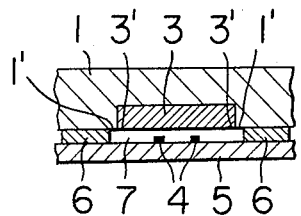
FIGS. 2 to 5 are each a cross-sectional view of part of the key-board switch unit according to the present invention.

FIG. 2 illustrates a cross sectional view of part of a typical embodiment of the inventive key-board switch units, which is composed of a base plate 5 made of a relatively rigid and electrically insulating material, at least one pair of electrodes 4,4 fixedly provided on one surface of the base plate 5, a covering pad 1 made of an electrically insulating rubbery material and placed to cover the base plate 5 leaving a void space 7 therebetween at the portion facing the pair of the electrodes 4,4, and a contact member 3 made of an electrically conductive rubbery material and embedded in and adhesively bonded to the covering pad 1 at the portion facing the void space 7 in such a manner that, when the covering pad 1 is depressed at the position above the void space 7 with a finger tip or the like toward the base plate 5, the contact member 3 comes into contact with the pair of the electrodes 4,4 to close an electric circuit therebetween. The covering pad 1 is held slightly apart from the base plate 5 by means of the spacers 6,6 so as that an adequate switching stroke can be ensured between the surface of the contact member 3 and the pair of the electrodes 4,4.

It is essential in this disposition that the surface of the contact member 3 facing the electrodes 4,4 is at substantially the same level as or coplanar with the surface of the covering pad 1 in the portion facing the void space 7 at least at the peripheries 3' thereof so that the surface above the void space 7 shows a smooth transition from the surface of the covering pad 1 to the surface of the contact member 3.

It is also important that the contact member 3 is so small that the surface thereof is confined within the surface of the covering pad 1 in the portion facing the void space to leave a marginal area 1' around the contact member 3. The above described relationships between the covering pad 1 and the contact member 3 are essential in order to avoid localized concentration of the stress caused by repeated application and releasing of the pushing force to depress the covering pad 1 toward the base plate 5. That is to say, when the surface of the contact member 3 is not coplanar with the surface of the covering pad 1 at the peripheries 3' thereof, the stress by the depression of the covering pad 1 is most likely concentrated along the line of conjunction between the contact member 3 and the covering pad 1 leading to eventual destruction of the switch unit.

Further, when the contact member 3 is somewhat larger than that shown in FIG. 2 not to leave the marginal area 1' of the covering pad 1, the stress is concentrated along the contacting line between the contact member 3 and the spacers 6,6 where the contact member 3 is most likely destroyed by the repeated application of the pushing force for depression since electroconductive rubbers are usually not strong enough mechanically because of the large amount of loading with an electroconductive particulate material such as a metal powder or carbon black.

Another important parameter other than the above described configuration of the individual parts is the hardness of the rubbery materials for the contact member 3 and the covering pad 1 from the standpoints of ensuring high durability of the switch unit and satisfactory performance thereof. Thus, the preferable ranges of the rubber hardness are, as determined in the JIS scale, from 30 to 70 or, more preferably, from 45 to 65 for the covering pad 1 and from 40 to 80 or, more preferably, from 50 to 70 for the contact member 3.

When the hardness of the rubbery material for the covering pad 1 is smaller than 30, extraneous signals may be sometimes produced due to the insufficient resilience of the rubber and fatigue of the rubbery material caused by repeated operation of the swtich while, when the hardness is larger than 70, the covering pad 1 is relatively rapidly becomes ruptured by repeated deformation or elongation with depression of the covering pad 1 in addition to the less pleasant touch when the covering pad is depressed with a finger tip.

On the other hand, the hardness of the electroconductive rubbery material for the contact member 3 is limited within the above specified range because a rubber having a hardness smaller than 40 is excessively susceptible to stretch or compression when the covering pad is depressed resulting in uncontrollable changes in the resistance of the contact member 3 per se and a contact member 3 made of such a low hardness rubber takes a longer time for coming apart from the electrodes 4,4 when the pushing force is released because it acts something like a sucker disc while a rubbery material for the contact member 3 having a hardness larger than 80 is undesirable because such a hard rubber is liable to be cracked and the electroconductive particles filling the rubber sometimes come off from the rubber matrix to cause irregular condition of electric conduction if not to mention the poor touch to the finger tip pushing the covering pad to depress it.

It is further desirable that the difference in the hardness of the rubbers is as small as possible between the covering pad 1 and the contact member 3 in order to avoid local concentration of stress caused by depression of the covering pad along the peripheries 3' of the contact member 3. This condition of approximately equal hardness of the rubbery materials is also desirable in order to minimize the stepwise difference in level between the surface of the covering pad 1 and the contact member 3 resulting from the shrinkage of the materials in molding and curing.

Figure 3:
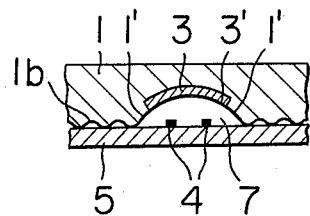
Figure 4:
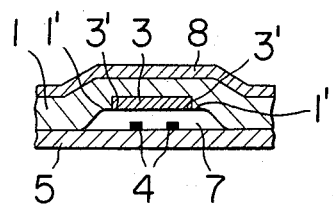

FIG. 3 and FIG. 4 illustrate alternative embodiments of the inventive key-board switch units by the cross sections similar to FIG. 1. In FIG. 3, the covering pad 1 has a dome-like concavity which forms a void space 7 with the base plate 5 when the covering pad 1 is placed to cover the base plate 5 in such a manner that a pair of the electrodes 4,4 becomes positioned in the void space 7. In this case, the covering pad 1 is directly bonded to the base plate 5 without using spacers as in the model shown in FIG. 1.

The contact member 3 in the model shown in FIG. 3 is itself shaped as curved so as that a smooth ceiling of the dome-like concavity is formed with the surface of the contact member 3 and the marginal area 1' of the covering pad 1, the surface of the contact member 3 being coplanar with the marginal area 1' of the covering pad 1 along the periphery 3' thereof.

The covering pad 1 shown in FIG. 3 is provided with grooves 1b which serve as an air escape on the surface of bonding with the base plate 1 for the air in the void space 7 when the covering pad 1 is depressed for closing the electric circuit between the electrodes 4,4. Such an air escape means is obtained not only by the grooves 1b as shown in FIG. 3 but also when the surface of the covering pad 1 contacting with the base plate 5 is rugged or roughened by sand-blasting or other suitable method.

FIG. 4 illustrates a further alternative embodiment of the present invention in which the concavity of the covering pad 1 or the void space 7 is in a form of a truncated cone or pyramid and the covering pad 1 is bonded to the base plate 5 directly without spacers used in the model shown in FIG. 2. The surface of the contact member 3 is made flat but yet is coplanar with the marginal area 1' or the surface of the covering pad 1.

The upper surface of the covering pad 1 in FIG. 4 is somewhat raised in the portions corresponding to the contact member 3 contributing to reduce wrong touch by the finger tip. The upper surface of the covering pad 1 is also provided with a reinforcing sheet 8 as laminated therewith with an object to enhance the rigidity and recoverability of the resilient covering pad 1 following the release of the depression.

Figure 5:
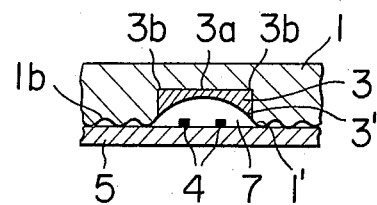

The model shown in FIG. 5 by the cross section is a further modification of the model shown in FIG. 3. Different from the contact member 3 in FIG. 3 having a uniform thickness, the contact member 3 in FIG. 5 has a cross section with a smallest thickness at the center 3a thereof and the thickness is increased to the periphery 3b. With this configuration of the contact member 3, additional advantages are obtained that the depression of the contact member 3 by a finger tip can be performed with lighter touch when the hardness of the contact member 3 is larger than that of the covering pad 1 and yet the regain of the undepressed state of the contact member 3 is more rapid when the depressing force is released.

As is readily understood from the above description, the present invention is very advantageous in the possibility of an extremely thin design of key-board switch units in comparison with the conventional ones as illustrated in FIG. 1. A further problem in the key-board switch unit shown in FIG. 1 is the low reliability in switching. Since the covering pad 1 has protruded bosses 2 and manual depression for closing the electric circuit is always at the top of the protruded boss 2, it is very likely that the pushing force for depression with a finger tip is not directed vertically but in a biased direction causing uncertainty in the electric contact between the contact member 3 and the electrodes 4,4.

On the contrary, the danger of such a wrong pushing is minimized in the inventive key-board switch units and high reliability in switching operation is always ensured by virtue of their very thin design. In this connection of obtaining high reliability in switching, it is sometimes preferable that each of the paired electrodes 4,4 is provided with two or more of contacting points and the contacting points of one of the electrodes are arranged in an alternate disposition with the contacting points of the counterelectrode so as that even a biased pushing of the covering pad 1 can reliably close the electric circuit between the electrodes 4,4.

What is claimed is:

1. A key-board switch unit which comprises
   (a) a base plate,
   (b) at least one pair of electrodes fixedly provided on one surface of said base plate,
   (c) a covering pad made of an electrically insulating rubbery material having a hardness of 30 to 70 in the JIS scale placed to cover the base plate leaving at least one void space therebetween at the portion facing the pair of the electrodes, and
   (d) at least one contact member made of an electrically conductive rubbery material having a hardness of 40 to 80 in the JIS scale and embedded in and adhesively bonded to the covering pad at the portion facing the void space in such a manner that, when the covering pad is depressed toward the base plate, the contact member comes into contact with the electrodes to close an electric circuit therebetween, the surface of the contact member being substantially coplanar with the surface of the covering pad at least at the periphery thereof and the surface of the contact member being confined within the surface of the covering pad in the portion of the void space.

2. The key-board switch unit as claimed in claim 1 which is provided with an air escape at the interface between the base plate and covering pad.

3. The key-board switch unit as claimed in claim 1 wherein each of the paired electrodes has at least two contacting points, said contacting points being arranged in an alternate disposition with the contacting points of the counterelectrode.

4. The key-board switch unit as claimed in claim 1 wherein the hardness of the rubbery material of the covering pad is substantially equal to the hardness of the rubbery material of the contact member.

* * * * *

UNITED STATES PATENT AND TRADEMARK OFFICE
CERTIFICATE OF CORRECTION

PATENT NO. : 4,302,648
DATED : November 24, 1981
INVENTOR(S) : Ryoichi Sado et al It is certified that error appears in the above-identified patent and that said Letters Patent are hereby corrected as shown below:

On the title page add:

"[30]   Foreign Application Priority Data

Jan. 26, 1978 [JP]  Japan . . . . . . . . . 53-7711"

Signed and Sealed this

Twelfth Day of July 1983

[SEAL]

Attest:

GERALD J. MOSSINGHOFF

Attesting Officer     Commissioner of Patents and Trademarks